United States Patent
Haldner et al.

(10) Patent No.: US 8,981,781 B2
(45) Date of Patent: Mar. 17, 2015

(54) DEVICE AND METHOD FOR DETECTING AN OBJECT IN A SUBSURFACE

(75) Inventors: Patrick Haldner, Schaan (LI); Christoph Wuersch, Werdenberg (CH); Wilfried Kaneider, Rankwell (AT); Dietmar Schoenbeck, Goefis (AT); Sascha Korl, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 103 days.

(21) Appl. No.: 13/548,907

(22) Filed: Jul. 13, 2012

(65) Prior Publication Data
US 2013/0043872 A1 Feb. 21, 2013

(30) Foreign Application Priority Data
Jul. 15, 2011 (DE) .......................... 10 2011 079 276

(51) Int. Cl.
  *G01V 3/10* (2006.01)
  *G01V 3/165* (2006.01)
(52) U.S. Cl.
  CPC ..................................... *G01V 3/165* (2013.01)
  USPC ........................................................ 324/329
(58) Field of Classification Search
  CPC ........... G01V 3/17; G01V 3/165; G01V 3/06; G01V 3/12
  USPC .................................. 324/329, 334, 335, 336
  See application file for complete search history.

(56) References Cited

U.S. PATENT DOCUMENTS

| 4,896,116 A | 1/1990 | Nagashima et al. |
| 5,557,206 A * | 9/1996 | Won ............................... 324/329 |
| 7,391,362 B2 * | 6/2008 | Beckner ........................ 342/179 |
| 7,741,848 B1 | 6/2010 | Olsson et al. |
| 7,990,151 B2 * | 8/2011 | Olsson et al. .................. 324/326 |
| 7,999,550 B2 * | 8/2011 | Morrison et al. ............. 324/326 |
| 2008/0036644 A1 | 2/2008 | Skultety-Betz et al. |
| 2008/0297158 A1 | 12/2008 | Heger et al. |

FOREIGN PATENT DOCUMENTS

DE  10 2004 007 315  8/2005

OTHER PUBLICATIONS

Author: David J. Wright, Title: Frequency Domain Electromagnetic Sensor Array Development, Date: Sep. 17, 2007, Publisher: SAIC, Advanced Sensors and Analysis Division, pp. 1-24.*

(Continued)

*Primary Examiner* — Harshad R Patel
(74) *Attorney, Agent, or Firm* — Davidson, Davidson & Kappel, LLC

(57) ABSTRACT

A device for detecting an object in a subsurface, including a transmitting unit having a transmitting element designed to emit a transmission signal into the subsurface, a receiving unit having two or more receiving elements designed to receive a reception signal which is a function of the transmission signal and the properties of the object and of the subsurface, a control and evaluation unit which is designed to control the transmitting unit and receiving unit and to evaluate the reception signals, and a display unit which is designed to display the reception signals evaluated by the control and evaluation unit. The transmitting unit has at least one further transmitting element which is designed to emit at least one further transmission signal into the subsurface, and the transmitting elements of the transmitting unit are controllable independently of one another by the control and evaluation unit. A method is also provided.

9 Claims, 11 Drawing Sheets

(56) References Cited

OTHER PUBLICATIONS

Authors: I.J. Won, Dean A. Keiswetter, David R. Hanson, Elena Novikova and Thomas M. Hall, Title: GEM-3: A Monostatic Broadband Electomagnetic Induction Sensor, Publisher: Journal of Environmental and Engineering Geophysics, vol. 2, Issue: 1, Date: Mar. 1997, pp. 53-64.*

* cited by examiner

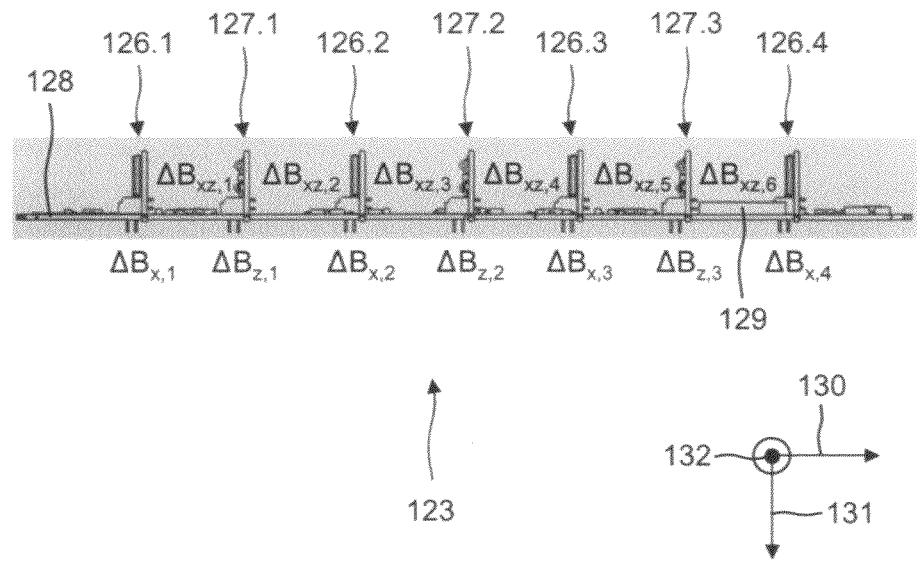
FIG. 6B
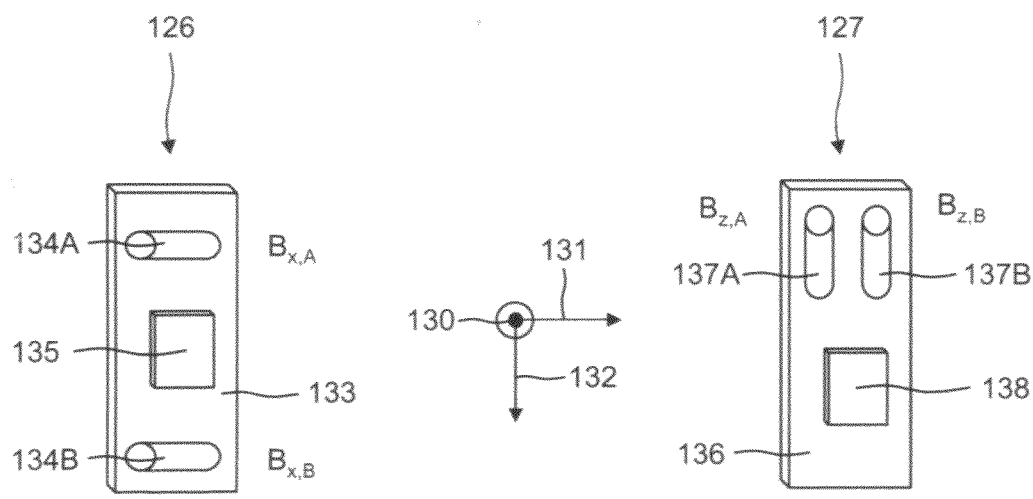
FIG. 6C  FIG. 6D

DEVICE AND METHOD FOR DETECTING AN OBJECT IN A SUBSURFACE

This claims the benefit of German Patent Applicatin DE 10 2011 079 276, filed Jul. 15, 2011 and hereby incorporated by reference herein.

The present invention relates to a device for detecting an object in a subsurface, and a method for detecting an object in a subsurface.

Typical objects that are detected in subsurfaces are water pipes, iron reinforcement bars, electric lines and power lines, moisture accumulations, and cavities. Within the scope of the present patent application, the term "object" collectively refers to any given solid, liquid, and gaseous objects which are embedded in subsurfaces. Due to the accident hazard when a power line is severed, power lines must be recognized with a high degree of reliability by a detection device. A power line is a current-conducting electric line which during operation generates a magnetic field which may be used for detecting the power line in a subsurface. Although telephone or antenna cables represent electric lines, they conduct only a very small current and do not fall under the definition of the term "power line" as used within the scope of the present patent application.

BACKGROUND

A device known under the product name PS 200 for detecting an object in a subsurface has a transmitting unit having a transmitting element which is designed to emit a transmission signal into the subsurface, a receiving unit having two or more receiving elements which are designed to receive a reception signal which is a function of the transmission signal and the properties of the object and of the subsurface, a control and evaluation unit which is designed to control the transmitting unit and receiving unit and to evaluate the reception signals, and a display unit which is designed to display the reception signals evaluated by the control and evaluation unit. For detecting an object in the subsurface, the single transmitting element emits a transmission signal, and each of the receiving elements receives a reception signal.

SUMMARY OF THE INVENTION

A disadvantage of the known device and the known method for detecting an object in a subsurface is that the detection device which is guided along an advance direction has only one transmitting element, and the spatial resolution of the detection device is greatly limited transverse to the advance direction. In addition, multiple parallel measuring paths must be measured in order to detect a surface area, i.e., a certain width transverse to the advance direction.

It is an object of the present invention to provide a device and a method for detecting an object in a subsurface in such a way that the spatial resolution of the detection device is increased and the accuracy of the measuring results is improved. In addition, the aim is for the measuring results to be displayed on the display unit of the detection device in essentially real time.

In the device for detecting an object in a subsurface, the present invention provides that the transmitting unit has at least one further transmitting element which is designed to emit at least one further transmission signal into the subsurface, the transmitting elements of the transmitting unit being controllable independently of one another by the control and evaluation unit. A transmitting unit having multiple transmitting elements which are controllable independently of one another allows the number of reception signals evaluated by the control and evaluation unit to be increased. The greater the number of reception signals received, the better the spatial resolution.

In one preferred design, one transmitting element of the transmitting unit and one receiving element of the receiving unit are integrated in each case into a first sensor unit as a sensor element, with the aid of the control and evaluation unit the sensor elements being switchable between a transmitting mode in which a sensor element emits a transmission signal and a receiving mode in which a sensor element receives a reception signal. As the result of sensor elements which act as both transmitting elements and as receiving elements, either the number of transmitting elements and receiving elements is reduced and the detection device has a smaller design or the resolution of the detection device may be increased by additional sensor elements.

The transmitting elements and receiving elements are designed as ultrasonic sensors, inductive sensors, capacitive sensors, radar sensors, magnetic field sensors, or other types of sensors which are suitable for detecting objects in subsurfaces. The radar sensors are designed, for example, as pulse radar sensors, stepped-frequency radar sensors (stepped-frequency continuous wave, frequency-modulated continuous wave, stepped chirp), pseudo-random noise radar sensors, or multisine radar sensors. Examples of suitable magnetic field sensors include coils, Hall sensors, magnetoimpedance sensors, magnetoinductive sensors, fluxgate sensors, giant magnetoresistance sensors, colossal magnetoresistance sensors, and anisotropic magnetoresistance sensors.

The first sensor unit preferably has at least three sensor elements which are arranged in an interleaved configuration at least in a first row and a second row, the sensor elements in the second row being situated between the sensor elements in the first row. The interleaved configuration of the sensor elements has the advantage that the spatial resolution of the detection device is increased compared to a uniform configuration of the sensor elements in rows and columns. The interleaved configuration is therefore also suited in particular for detection devices having large sensor elements, such as radar sensors, whose dimension is determined by the frequency band used. The distance between the sensor elements within a row as well as the distance between adjacent rows is adapted, for example, to the sensor elements used and the measuring tasks.

The transmitting elements of the transmitting unit are preferably designed to emit transmission signals having a first polarization direction and transmission signals having a second polarization direction, the second polarization direction being different from the first polarization direction. The receiving elements of the receiving unit are particularly preferably designed to simultaneously receive a first reception signal in the first polarization direction and a second reception signal in the second polarization direction. By measuring using two different polarization directions, for example parallel and perpendicular to a linear advance direction, various materials may be differentiated and the orientation of the objects may be determined. The materials iron and plastic have different, complementary reflection amplitudes (radar cross sections) for different polarization directions, so that plastic and iron, i.e., plastic pipes and iron reinforcement bars, for example, may be differentiated by using different polarization directions. Based on the reflection amplitudes of two different polarization directions, it is theoretically possible to deduce the diameter of an iron reinforcement bar.

The control and evaluation unit preferably includes a memory unit having a main memory and a digital stack memory (buffer memory). The reception signals are digitally averaged in the digital stack memory before they are relayed to the main memory. The communication bandwidth to the main memory of the control and evaluation unit may be minimized by carrying out the averaging locally (in an FPGA, for example). The advantages of a digital stack memory are that the averaging number may be defined via the application. For example, if the advance speed is very high while the spatial sampling frequency remains constant, the averaging number may be dynamically reduced. In this way, the application may still be met although higher noise is accepted. On the other hand, in difficult measuring situations (external interferences, low signals) it is thus possible to achieve a maximum signal-to-noise ratio based on the reception signals via a slow advance motion.

In one preferred specific embodiment, a second sensor unit having second sensor elements is provided, the second sensor elements differing from the first sensor elements in at least one sensor property. The spatial resolution of the detection device and the accuracy of the measurement may be increased by using multiple sensor units having different sensor properties. The term "sensor property" collectively refers to all properties of sensor units, such as size, position, orientation, and type of sensor. For radar sensors, the sensor properties include additional sensor properties such as polarization (linear, circular, parallel, perpendicular), bandwidth, frequency band, and type of modulation, and for inductive sensors, additional sensor properties include amplitude, frequency range, excitation pattern, sensitivity, and bandwidth. Various objects may be reliably detected by using different types of sensors, or by using one type of sensor having different sensor properties. For example, inductive sensors in the form of coils having a small coil diameter reliably detect near-surface, closely spaced objects (small separation), whereas coils having a large coil diameter reliably detect remote-surface objects. Near-surface as well as remote-surface objects are reliably detected by combining small and large coils in an inductive sensor unit. Depending on the field of application of the detection device, any known sensor elements may be combined with one another.

If is preferred that the measuring results of the first sensor unit are representable in a first display mode, the measuring results of the second sensor unit are representable in a second display mode, and the measuring results of the first sensor unit and second sensor unit are representable in a third display mode on the display unit. For detection devices having two different sensor units, the control and evaluation unit computes joint depth section images and/or separate depth section images. A joint top view may be computed from the joint depth section images and represented on the display unit. Joint depth section images and a joint top view have the advantage that all objects in a representation are displayed. Separate depth section images and separate top views computed therefrom may be displayed simultaneously or consecutively on the display unit.

The second sensor unit is preferably designed as a current sensor unit for detecting a power line. Due to the accident hazard when a power line is severed, power lines must be recognized with a high degree of reliability by a detection device. The reliability with which a power line is detected is increased as a result of the second sensor unit, which is provided solely for detecting power lines.

In one preferred specific embodiment, the current sensor unit has first and second magnetic field sensor elements, the first magnetic field sensor elements detecting a magnetic field or a magnetic field gradient in a first direction, and the second magnetic field sensor elements detecting a magnetic field or a magnetic field gradient in a second direction which is different from the first direction. The second direction is particularly preferably oriented perpendicularly to the first direction.

The current sensor unit particularly preferably has third magnetic field sensor elements which detect a magnetic field or a magnetic field gradient in a third direction which is different from the first and second directions. The third direction is particularly preferably oriented perpendicularly to the first and second directions. As the result of detecting the magnetic field or the magnetic field gradient of the power line in a third direction, the reliability of the measurement and the accuracy of the spatial association of the power line in the subsurface are increased in particular for sloped, bent, and/or twisted power lines and for multiphase current power lines.

In one alternative preferred specific embodiment, the current sensor unit has magnetic field sensor elements which detect a magnetic field or a magnetic field gradient in a first direction and in a second direction which is different from the first direction. The second direction is particularly preferably oriented perpendicularly to the first direction.

The magnetic field sensor elements particularly preferably detect a magnetic field or a magnetic field gradient in a third direction which is different from the first and second directions, the third direction particularly preferably being oriented perpendicularly to the first and second directions. As the result of detecting the magnetic field or the magnetic field gradient of the power line also in a third direction, the accuracy of the spatial association of the power line in the subsurface is increased in particular for sloped, bent, and/or twisted power lines and for multiphase current power lines.

The current sensor unit particularly preferably has a modulation unit which is connectable to the control and evaluation unit via a communication connection and which modulates a current signal of the power line following a control instruction of the control and evaluation unit. By modulating the current signal having a known pattern, the reception signals of the power line may be better identified by the magnetic field sensor elements. The modulation unit is designed in such a way, for example, that it is plugged into a socket present in the subsurface and coupled to a phase of the power line. The control and evaluation unit particularly preferably has an evaluation module for demodulating the reception signals.

In one preferred specific embodiment, the control and evaluation unit is designed to compute multiple depth section images based on the reception signals of the receiving elements. The control and evaluation unit is particularly preferably designed to compute from the depth section images a top view as the average value, median, maximum value, or weighted sum over a depth range between a first depth and a second depth and to display same on the display unit, the first depth and the second depth particularly preferably being designed to be adjustable. In addition to the mentioned mathematical functions of average value, median, maximum value, and weighted sum, any suitable mathematical function may be used to compute the top view. Based on the top view, the user obtains a direct spatial association of the objects in relation to the subsurface. Due to the adjustability of the first and second depths, objects which are embedded at various depths in the subsurface may be represented separately from one another in the top view. The user may limit the objects represented in the top view to various depth ranges.

Compared to hand-guided detection devices which carry out an arbitrary advance motion, hand-guided detection devices which carry out a linear advance motion have the advantage that the spatial resolution in the advance direction is increased as a result of the advance motion, and fewer transmitting elements and receiving elements are necessary.

The width of the sensor unit in the advance direction plays no role, since the sensor unit is moved over the subsurface continuously, i.e., with a very high spatial resolution, in the advance direction. Since no direction is preferred for an arbitrary advance motion, the number of transmitting elements and receiving elements in both directions should be approximately equal in order to achieve a comparable spatial resolution. An arbitrary advance motion has the advantage over a linear advance motion that the user himself may determine in which ranges measurement is carried out. It is thus possible to detect any given surface contours, which is a significant advantage for inaccessible situations. For a linear advance motion, either segments or predefined grids are traversed. To allow these grids to be traversed, templates adhesively affixed to the subsurface are used.

According to the present invention, the method for detecting an object in a subsurface is characterized by the following additional steps: emitting a further transmission signal into the subsurface via a further transmitting element of the transmitting unit, and receiving a reception signal, which is a function of the further transmission signal and the properties of the object and of the subsurface, by each receiving element of the receiving unit.

Preferably, each transmitting element of the transmitting unit emits a transmission signal in succession, and for each transmission signal, all receiving elements of the receiving unit simultaneously receive a reception signal. The spatial resolution of the measurement is increased as the result of detecting all monostatic and bistatic reception signals.

It is preferred that in a first step, each of the transmitting elements of the transmitting unit emits a first transmission signal having a first polarization direction, and in a second step emits a second transmission signal having a second polarization direction which is different from the first polarization direction. It is particularly preferred that the receiving elements of the receiving unit simultaneously receive a first reception signal in the first polarization direction and a second reception signal in the second polarization direction. By measuring using two different polarization directions, for example parallel and perpendicular to a linear advance direction, various materials may be differentiated, and the orientation of the objects may be determined.

In one preferred method variant, it is provided that the reception signals are digitally averaged in a stack memory before they are transmitted to a main memory. The communication bandwidth to the main memory of the control and evaluation unit may be minimized by carrying out the averaging locally (in an external FPGA, for example). The advantages of a digital buffer memory are that the averaging number may be defined by the application, for example via an external trigger or by a user setting. For example, if the advance speed is very high while the spatial sampling frequency remains the same, the averaging number may be dynamically reduced as a function of the advance speed. In this way, the application may still be met although higher noise is accepted. On the other hand, in difficult situations (external interferences, low signals) it is thus possible to achieve a maximum signal-to-noise ratio based on the measuring data by slowly scanning. The use of a digital stack memory does not preclude using analog filters beforehand, which likewise act as averaging.

In one preferred method variant, multiple depth section images are computed by a control and evaluation unit based on the reception signals. Based on the depth section images, a top view is particularly preferably computed and displayed on the display unit, the top view being computed as the average value, median, maximum value, or weighted sum over a depth range between a first depth and a second depth. Via the top view, the user obtains a direct spatial impression of where the objects are situated in the subsurface. The depth range is particularly preferably designed to be adjustable so that the user may limit the display of the top view to certain depth ranges.

It is particularly preferred that only objects which exceed a threshold value are represented in the top view, the threshold value particularly preferably being adjustable. The adjustability of the threshold value allows the user to adapt the representation of the top view to his requirements. Artifacts and interferences may be eliminated via the threshold value, so that the top view shows only the objects that the user would like to have represented.

The depth section images are particularly preferably interpolated. The resolution of the objects in the top view may be increased by interpolating the depth section images. The interpolation is suited, for example, for guided detection devices which are moved over the subsurface in a linear advance motion.

It is preferred that a first magnetic field gradient is detected in a first direction, and a second magnetic field gradient is detected in a second direction, the first and second directions particularly preferably being perpendicular to one another. In one particularly preferred variant, it is provided that the sensor unit is moved over the subsurface in an advance direction, the first magnetic field gradient is detected in a horizontal direction which is perpendicular to the advance direction, and the second magnetic field gradient is detected in a depth direction which is perpendicular to the advance direction and to the horizontal direction. The course of a power line in the subsurface may be determined based on the magnetic field gradient in the horizontal direction and the depth direction.

It is particularly preferred that first and second magnetic field sensor elements are situated in alternation in the horizontal direction, and an average absolute value is computed based on the first magnetic field gradient and the second magnetic field gradient of adjacent first and second magnetic field sensor elements. Due to the alternating configuration of the magnetic field sensor elements along the horizontal direction, the number of magnetic field sensor elements required for determining the spatial course of a power line in the subsurface is reduced.

Based on the average absolute values of the adjacent first and second magnetic field sensor elements, the control and evaluation unit particularly preferably computes a horizontal representation, and the horizontal representation is transmitted by the control and evaluation unit to a display unit and displayed on the display unit. Based on the horizontal representation, the user obtains a spatial impression of where the power line extends in the subsurface.

BRIEF DESCRIPTION OF THE DRAWINGS

Exemplary embodiments of the present invention are described below with reference to the drawings. The drawings do not necessarily illustrate the exemplary embodiments to scale, but, rather, are depicted in schematic and/or slightly distorted form when this is useful for the explanation. With respect to additions to the teaching which are directly apparent from the drawings, reference is made to the relevant related art. In this regard it is noted that a variety of modifications and alterations regarding the form and the detail of a specific embodiment may be made without departing from the general concept of the present invention. The features of the present invention disclosed in the description, the drawings, and the claims may be important to the refinement of the present invention, taken alone as well as in any given combination. In addition, any combination composed of at least two of the features disclosed in the description, the drawings, and/or the claims fall within the scope of the present invention. The general concept of the present invention is not limited to the exact form or the detail of the preferred specific embodiment illustrated and described below or is not limited to a subject matter which would be delimited in comparison to the subject matter claimed in the claims. For given dimension ranges, values within the stated limits are also intended to be disclosed as limiting values, and may be used and claimed as desired. For the sake of simplicity, the same reference numerals are used below for identical or similar parts or parts having an identical or similar function.

FIGS. 6A through 6D show another specific embodiment of a detection device according to the present invention which includes a radar sensor unit and a current sensor unit (FIG. 6A), the current sensor unit of FIG. 6A having first and second magnetic field sensor elements (FIG. 6B), and the first magnetic field sensor element (FIG. 6C) and the second magnetic field sensor element (FIG. 6D) in an enlarged illustration.

DETAILED DESCRIPTION

Figure 1:
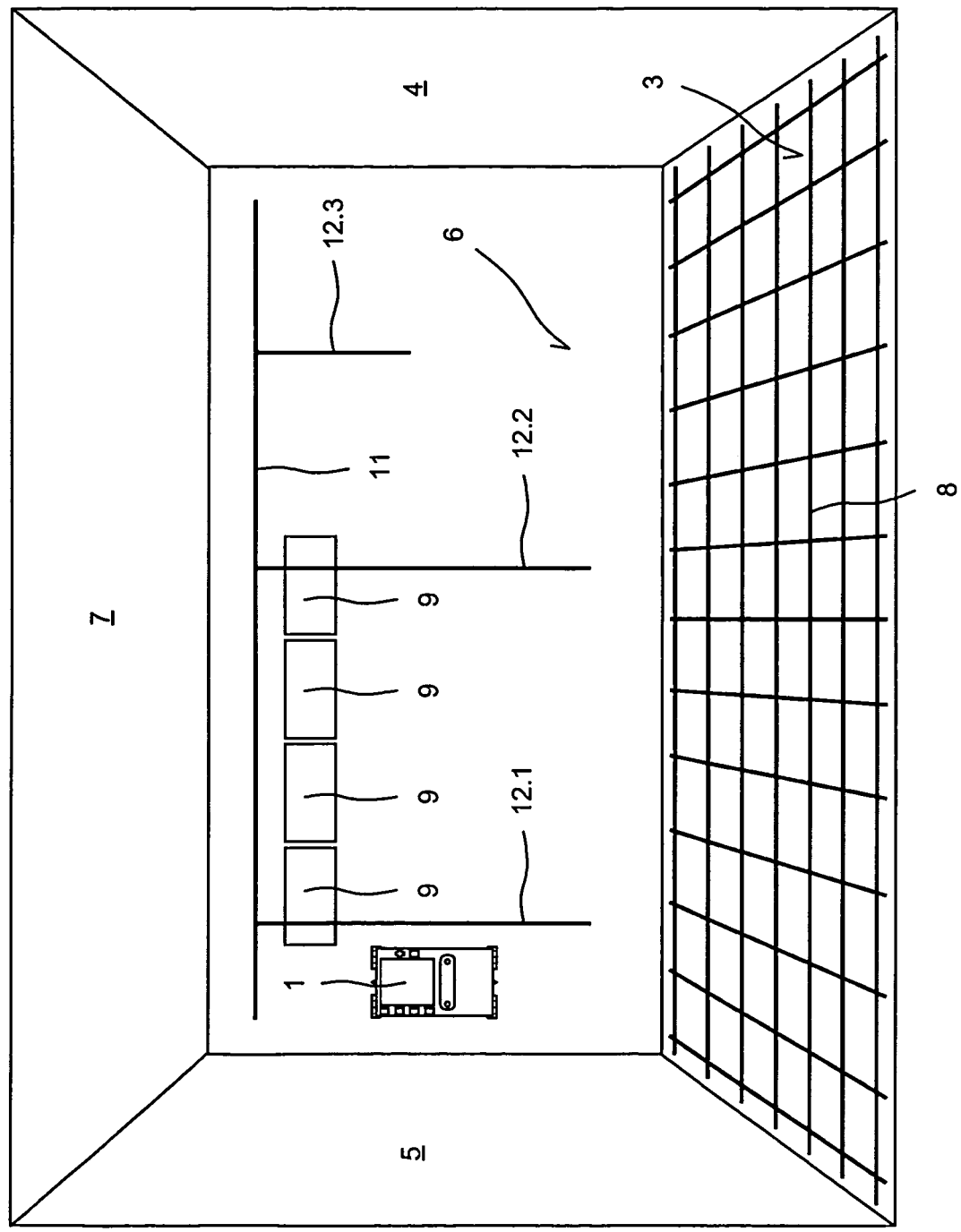
FIG. 1 shows the use of a detection device according to the present invention in an internal space, having a concrete floor with an embedded iron grate and a masonry back wall made of bricks, together with horizontally and vertically extending power lines.

FIG. 1 shows the use of a device 1 according to the present invention for detecting an object in an internal space 2. Detection device 1 is designed as a held or guided detection device. A held detection device is held over the subsurface to be detected without advance motion, and a guided detection device is guided over a subsurface to be detected, along a linear path or in an arbitrary path. "Hand-held or "hand-guided" refers to a detection device which a user holds or guides, respectively, by hand over the subsurface to be detected.

Internal space 2 is composed of a floor 3, a right and left side wall 4, 5, respectively, a back wall 6, and a ceiling 7. Floor 3 is composed of a concrete slab having an embedded iron grate 8. Back wall 6 is made of masonry blocks or bricks 9. A horizontal power line 11 and three vertical power lines 12.1, 12.2, 12.3 which branch off from horizontal power line 11 extend into back wall 6.

Figure 2A:
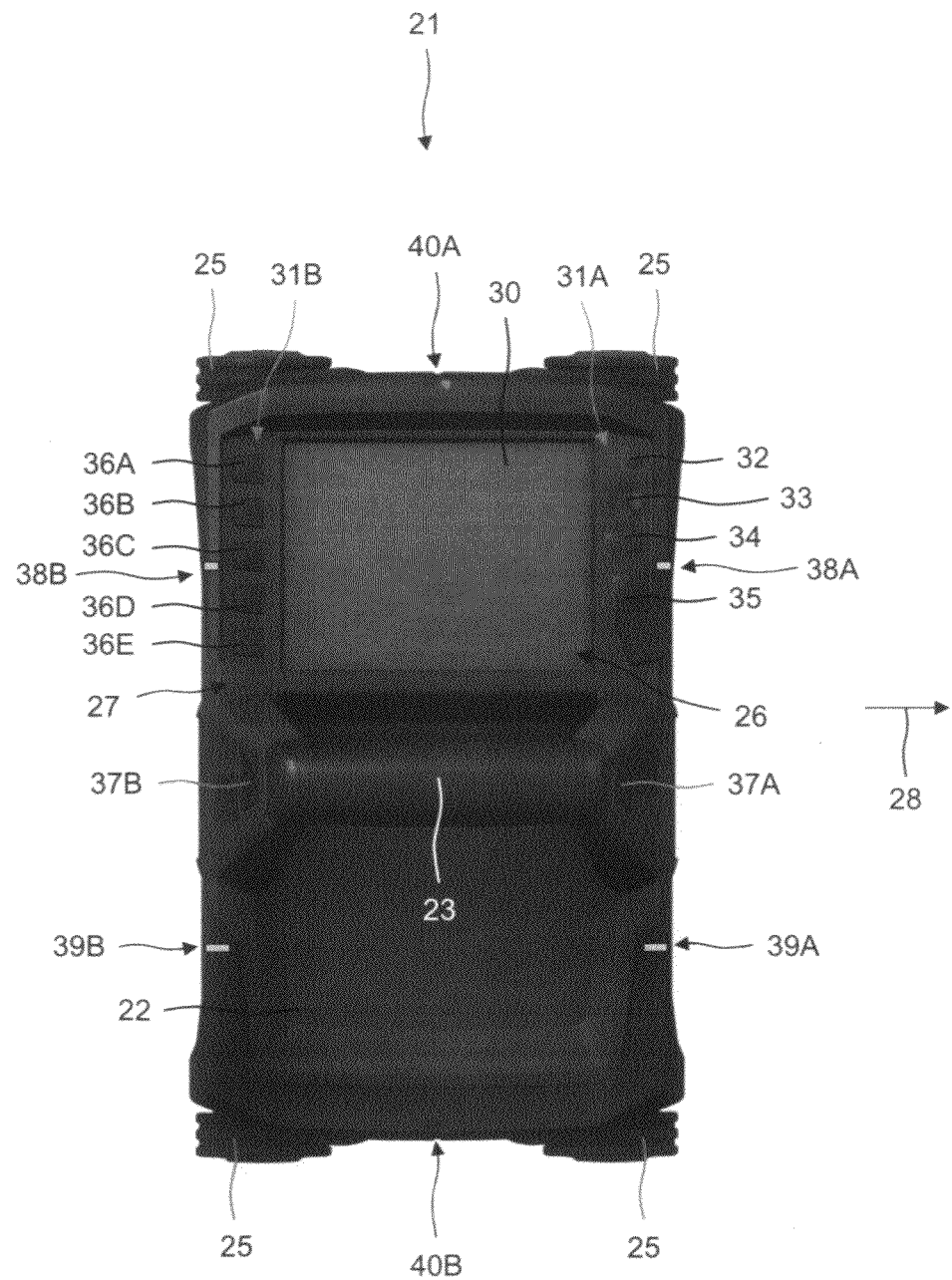
FIGS. 2A, 2 B show a first specific embodiment of a hand-guided detection device according to the present invention, in a view of the top side of the detection device facing away from the subsurface to be detected (FIG. 2A), and a measuring device, situated in the interior, having a first sensor unit and a second sensor unit, in a view of the bottom side of the detection device facing the subsurface to be detected (FIG. 2B)

FIG. 2A shows a first specific embodiment of a hand-guided detection device 21 which includes a housing 22, a handle 23, a motion unit 24 having four wheels 25, a display unit 26, and a control unit 27.

The user guides detection device 21, with the aid of handle 23 and motion unit 24, in an advance direction 28 over a subsurface to be detected which is designed as a floor 3 or back wall 6, for example. Handle 23 is situated on a top side 29 of detection device 21 which faces away from subsurface 3, 6 during a measurement, and is connected to housing 22. Display unit 26 includes a display 30 on which the measuring results of detection device 21 are displayed as a measuring recording.

Control unit 27 is used for starting a measurement and for adjusting detection device 21. Control unit 27 is composed of a first and a second control unit 31A, 31 B, respectively, which are situated on top side 29 next to display 30. First control unit 31A includes an on/off button 32 for switching detection device 21 on and off, a rocker switch 33 via which a marker line or a marker cross may be positioned and moved in a representation on display 30, and two additional control buttons 34, 35. Second control unit 31B includes five function buttons 36A through 36E for activating various functions of a function menu which is displayed on display 30. Control unit 27 also includes two start/stop buttons 37A, 37B, situated on handle 23, which are used for starting and ending a measurement.

The detection field of detection device 21 is delimited, and does not correspond to the full length of housing 22. The boundary of the detection field is indicated at the right housing edge of housing 22 by an upper and lower right mark 38A, 39A, and at the left housing edge by an upper and lower left mark 38B, 39B. With the aid of the marks, the user may place detection device 21 on the subsurface to be detected. The middle of the detection field is indicated by an upper and lower mark 40A, 40B at the upper and lower housing edge.

Figure 2B:
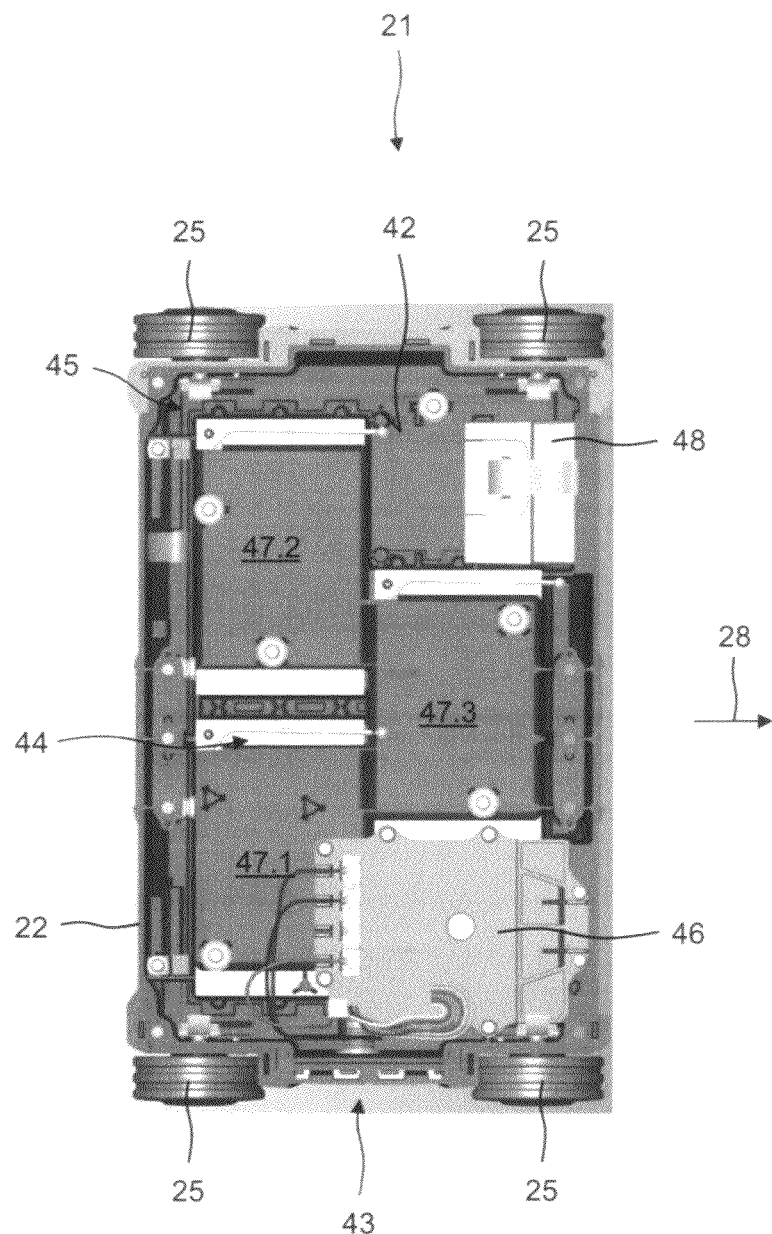

FIG. 2B shows detection device 21 in a view of a bottom side 42 facing subsurface 3, 6 during a measurement. A measuring device 43 is situated inside housing 22 at bottom side 42. Measuring device 43 includes a sensor unit 44, a control and evaluation unit 45, and a power supply unit 46.

Sensor unit 44 has a first sensor element 47.1, a second sensor element 47.2, and a third sensor element 47.3. Sensor elements 47.1 through 47.3 are designed as inductive sensors, capacitive sensors, radar sensors, magnetic field sensors, or other types of sensors which are suitable for detecting objects in subsurfaces. Control and evaluation unit 45 controls sensor elements 47.1 through 47.3, and is connected to sensor unit 44 via a communication connection, and to display unit 26 via a further communication connection. Control and evaluation unit 45 is used for controlling sensor elements 47.1 through 47.3, for evaluating the reception signals delivered by sensor elements 47.1 through 47.3, and for outputting a measuring result in the form of a measuring recording on display unit 26. Power supply unit 46 is connected to sensor unit 44, control and evaluation unit 45, and display unit 26, and provides units 44, 45, 26 with the electrical power required for the measuring operation.

Sensor elements 47.1 through 47.3 are interleaved in a first and second row in a plane parallel to the bottom side of housing 22. An interleaved configuration refers to an arrangement of sensor elements 47.1 through 47.3 in which the sensor elements are situated not in rows and columns in the manner of a matrix, but, rather, in which the sensor elements in one row or column are situated in the spaces in the preceding and the subsequent row or column. First and second sensor elements 47.1, 47.2 are situated in the first row, and third sensor element 47.3 is situated in the second row in the space between first and second sensor elements 47.1, 47.2. In principle, all known uniform configurations of elements in a plane (square, rectangular, hexagonal, rhombic, and rhombohedral) are suitable for the configuration of the sensor elements.

During the measurement, detection device 21 is moved at the advance speed in advance direction 28 over the subsurface to be detected. Measuring device 43 also includes a coordinate detection unit 48, with the aid of which the coordinates in advance direction 28 are detected. For a hand-guided detection device, via which an arbitrary advance motion may be carried out, the coordinates in the plane parallel to the bottom side of housing 22 are detected with the aid of the coordinate detection unit.

Figure 3A:
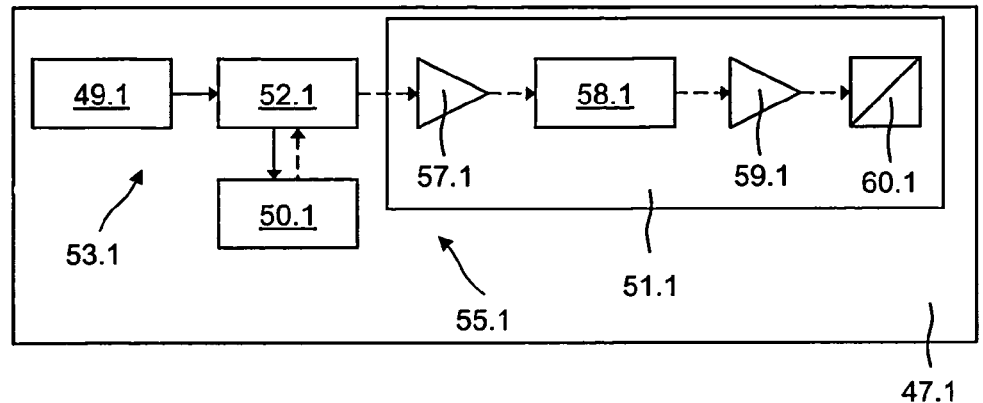
FIGS. 3A, 3B show the design of a single radar sensor element of the radar sensor unit (FIG. 3A), and the radar sensor unit of FIG. 2B having three radar sensor elements in a block diagram (FIG. 3B)

In the specific embodiment shown in FIG. 2B, sensor elements 47.1 through 47.3 are designed as radar sensors and operate according to the pulse radar principle. FIG. 3A schematically shows the design of first radar sensor element 47.1, the design being similar for second and third radar sensor elements 47.2, 47.3.

Figure 3B:
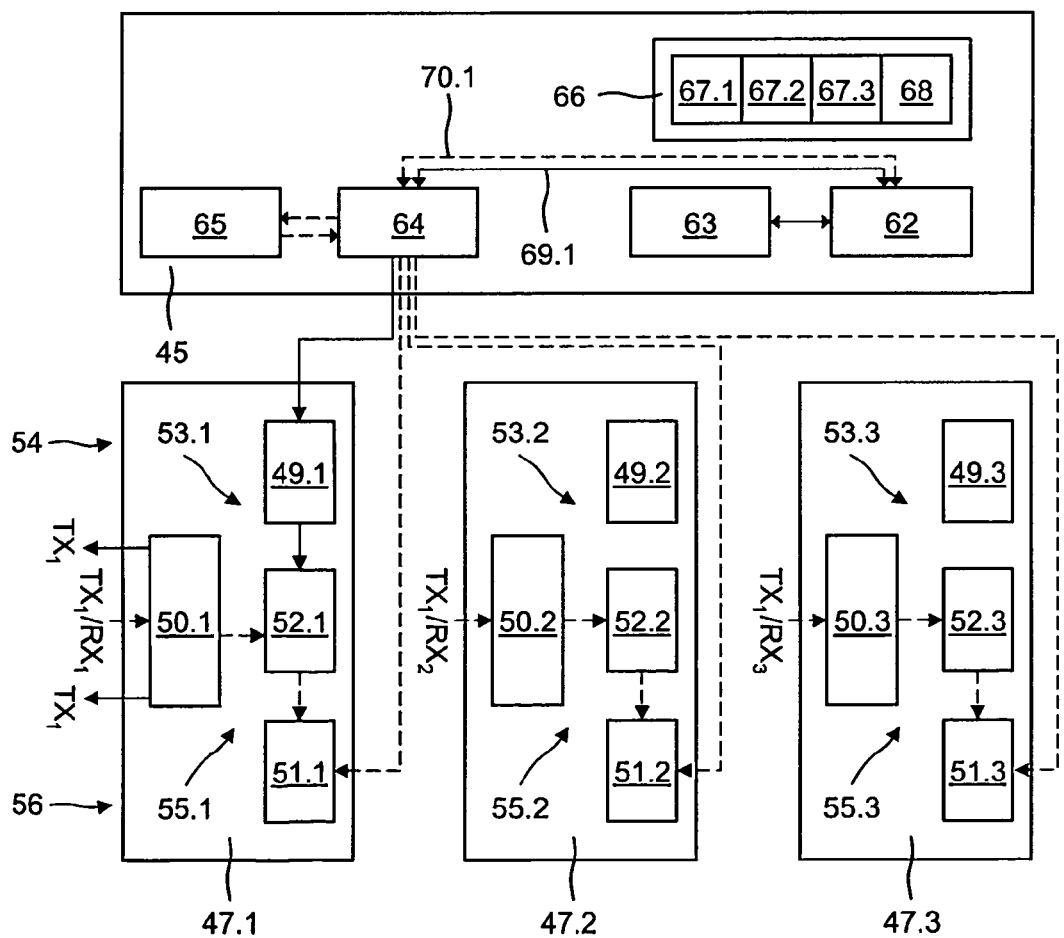

Radar sensor element 47.1 is composed of a transmitter 49.1 designed as an ultrabroadband pulse generator, for example, a radar antenna 50.1, a receiver 51.1, and a directional coupler 52.1. Transmitter 49.1 emits a high-frequency transmission pulse. Radar antenna 50.1 converts the high-frequency electromagnetic energy of the transmission pulse into electromagnetic radiation and distributes same in certain spatial directions by adapting the impedance of the conductor to the impedance of the surroundings. If a time measurement is carried out at the site of origin, from the start of emission of the transmission signal until the reception signal arrives, the distance between the site of origin and the object may be computed based on the known propagation speed, and depth information concerning the object in the Z direction may be obtained. Directional coupler 52.1 separates incoming and outgoing signals. Thus, via directional coupler 52.1, radar antenna 50.1 is connected to transmitter 49.1 in transmitting mode, and is connected to receiver 51.1 in receiving mode. In transmitting mode, transmitter 49.1, directional coupler 52.1, and radar antenna 50.1 are combined as transmitting element 53.1; transmitting elements 53.1, 53.2, 53.3 of the three radar sensor elements 47.1 through 47.3, respectively, are referred to as transmitting unit 54 (FIG. 3B). In receiving mode, receiver 51.1, directional coupler 52.1, and radar antenna 50.1 are combined as receiving element 55.1; receiving elements 55.1, 55.2, 55.3 of the three radar sensor elements 47.1, 47.2, 47.3, respectively, are referred to as receiving unit 56 (FIG. 3B).

The task of receiver 51.1 is to amplify and process the reception signals received from radar antenna 50.1; this receiver has various signal processing components. The signal processing components include a first amplifier 57.1 designed as a low noise amplifier (LNA for short), a scanner amplifier circuit 58.1, a second amplifier 59.1 designed as a negative feedback amplifier (NFA for short), and an analog-digital converter 60.1. In addition to signal processing components 57.1 through 60.1, all known signal processing components which are used in addition or as an alternative to signal processing components 57.1 through 60.1 are suitable, depending on the particular field of application.

FIG. 3B shows control and evaluation unit 45 and the three radar sensor elements 47.1, 47.2, 47.3 of radar sensor unit 44 in a block diagram. Control and evaluation unit 45 has various electronic components for controlling sensor elements 47.1 through 47.3, for evaluating the reception signals delivered by sensor elements 47.1 through 47.3, and for outputting a measuring result on display unit 26. The electronic components include a control unit 62, an oscillator 63, a switching unit 64, and a delay unit 65; control and evaluation unit 45 also includes a memory unit 66.

Control unit 62 is designed as a microcontroller or as an integrated circuit in the form of a field programmable gate array (FPGA for short) having an embedded controller, and controls switching unit 64 and delay unit 65. Oscillator 63 is used as a time basis for the pulse generation and the control; this time basis maps the pulse repetition frequency. The number of transmission pulses per second is defined as the pulse repetition frequency (PRF for short). Switching unit 64 is designed as a complex programmable logic device (CPLD for short); via switching unit 64, control unit 62 sets which transmitting element is switched into transmitting mode and which receiving element is switched into receiving mode. Delay unit 65 is designed, for example, as a digital delay unit (concatenation of controllable logic gates, for example ON Semiconductor MC100EP196) or as an analog delay unit (threshold value delay via a logic gate, comparator); via delay unit 65, control unit 62 sets the time delay for the receiving mode. Memory unit 66 is composed of a stack memory 67.1, 67.2, 67.3 for each radar sensor element 47.1 through 47.3, respectively, and a main memory 68.

A measurement is composed of a measuring step which is repeated at a repetition frequency of 50 Hz-5000 Hz. The measuring step is composed of three measuring substeps: in a first measuring substep, first radar sensor element 47.1 emits a first transmission signal $TX_1$, and the three radar sensor elements 47.1 through 47.3 receive a reception signal $TX_1/RX_1$, $TX_1/RX_2$, $TX_1/RX_3$, respectively. In a second measuring substep, second radar sensor element 47.2 emits a second transmission signal $TX_2$, and the three radar sensor elements 47.1 through 47.3 receive a reception signal $TX_2/RX_1$, $TX_2/RX_2$, $TX_2/RX_3$, respectively. In a third measuring substep, third radar sensor element 47.3 emits a third transmission signal $TX_3$, and the three radar sensor elements 47.1 through 47.3 receive a reception signal $TX_3/RX_1$, $TX_3/RX_2$, $TX_3/RX_3$, respectively. Radar sensor elements 47.1 through 47.3 are controlled via control and evaluation unit 45 in such a way that in transmitting mode, only one radar sensor element emits a transmission signal, and in receiving mode all radar sensor elements 47.1 through 47.3 receive a reception signal. Transmission signals $TX_1$, $TX_2$, $TX_3$ may be composed of a transmission pulse sequence.

The first measuring substep is illustrated in FIG. 3B. Control unit 62 generates a first control signal 69.1 and a second, contemporaneous control signal 70.1. First control signal 69.1 is used for controlling first transmitting elements 53.1 through 53.3; via switching unit 64, control unit 62 controls first transmitting element 53.1 to switch into transmitting mode and to emit transmission signal $TX_1$ into the subsurface. First control signal 69.1 is transmitted directly to first transmitting element 53.1 via switching unit 64. Second control signal 70.1 is used for controlling receiving elements 55.1 through 55.3; via switching and delay units 64, 65, control unit 62 sets the time delay and controls switching unit 64 in such a way that all receiving elements 55.1 through 55.3 are switched into receiving mode. With the aid of known methods, for example interleaved sampling (IS for short) or random interleaved sampling (RIS for short), the time delay for the receiving mode is set over the additional distance which must be covered by second control signal 70.1 between switching unit 64 and delay unit 65.

After the first transmission signal is emitted, radar antennas 50.1 through 50.3 receive reception signals $TX_1/RX_1$, $TX_1/RX_2$, $TX_1/RX_3$, respectively. Reception signals $TX_1/RX_1$, $TX_1/RX_2$, $TX_1/RX_3$ are relayed to receivers 51.1 through 51.3 via directional couplers 52.1 through 52.3, respectively, and are processed with the aid of the signal processing components. The processed reception signals are transmitted via control unit 62 into stack memories 67.1 through 67.3 of memory unit 66 and stored.

Similarly as for the first measuring substep, second transmitting element 53.2 is switched into transmitting mode via a control signal 69.2 in the second measuring substep, and third transmitting element 53.3 is switched into transmitting mode via a control signal 69.3 in the third measuring substep.

After each third measuring substep, reception signals $TX_i/RX_j$, where i, j=1, 2, 3, which are stored in stack memories 67.1 through 67.3, are averaged. The stacking (averaging) and storing of reception signals $TX_i/RX_j$, where i, j=1, 2, 3, is referred to as stacking. The stacking is carried out until a trigger signal emitted by control and evaluation unit 45 terminates the instantaneous stack and generates a new stack. The reception signals of the next measuring step are entered and stored in the new stack.

To increase the accuracy of a measurement and to allow various materials to be differentiated, in one refined method the transmission signals are emitted from radar sensor elements 47.1 through 47.3 using two different polarization directions P1, P2. For the three radar sensor elements 47.1 through 47.3, each of which emits a transmission signal $TX_{i,P1}$, $TX_{i,P2}$, where i=1, 2, 3, using two different polarization directions P1, P2, 36 reception signals result, as illustrated in Table 1.

transmits and receives, and "bistatic" refers to the mode in which a sensor element transmits and another sensor element receives.

The nine reception signals are associated with six delimited surface areas in the XY plane. A surface area 72.1, 72.2, 72.3, referred to as a monostatic surface, is directly associated with each sensor element 47.1, 47.2, 47.3, respectively. Monostatic reception signals $TX_i/RX_j$, where i=1, 2, 3, are associated with monostatic surface areas 72.1, 72.2, 72.3; first monostatic reception signal $TX_1/RX_1$ is associated with first monostatic surface area 72.1, second monostatic reception signal $TX_2/RX_2$ is associated with second monostatic surface area 72.2, and third monostatic reception signal $TX_3/RX_3$ is associated with third monostatic surface area 72.3. In the XY plane, first monostatic surface area 72.1 has coordinates $X_1$ and $Y_1$, second monostatic surface area 72.2 has coordinates $X_5$ and $Y_1$, and third monostatic surface area 72.3 has coordinates $X_3$ and $Y_3$.

Figure 4A:
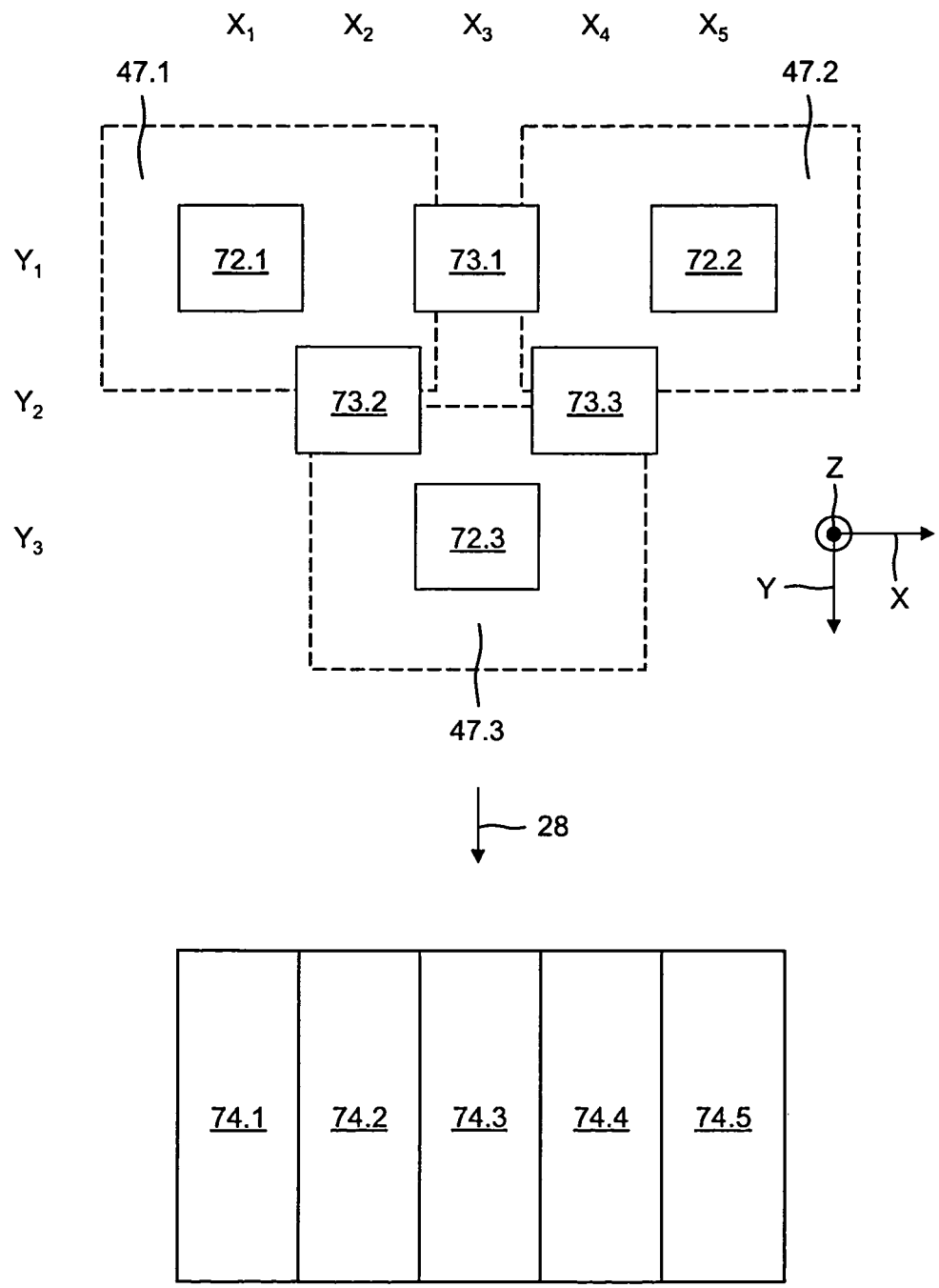
FIGS. 4A, 4B show the radar sensor unit of FIG. 2B, having three radar sensor elements, in a schematic illustration (FIG. 4A), and a measuring recording of the detection device which in a first operating mode is moved over the subsurface to be detected in an advance direction, in a top view and a depth illustration (FIG. 4B)

FIG. 4A shows three additional delimited surface areas 73.1, 73.2, 73.3, referred to as bistatic surface areas. Bistatic reception signals $TX_1/RX_2$ and $TX_2/RX_1$ are averaged, and the averaged signal is associated with bistatic surface area 73.1 situated between first and second surface areas 72.1 and 72.2, respectively. Bistatic reception signals $TX_1/RX_3$ and $TX_3/RX_1$ are averaged, and the averaged signal is associated with surface area 73.2 situated between first and third surface areas 72.1 and 72.3, respectively. Bistatic reception signals $TX_2/RX_3$ and $TX_3/RX_2$ are averaged, and the averaged signal is associated with surface area 73.3 situated between second and third surface areas 72.2 and 72.3, respectively. In the XY plane, first bistatic surface area 73.1 has coordinates $X_3$ and $Y_1$, second bistatic surface area 73.2 has coordinates $X_3$ and $Y_2$, and third bistatic surface area 73.3 has coordinates $X_3$ and $Y_2$.

In addition to the average formation, for example a median, a maximum value, or a weighted sum may be computed from the bistatic reception signals. The term "averaged signal" is

TABLE 1

Reception signals for three radar sensor elements which act as a transmitting element and a receiving element, and which transmit and receive using two different polarization directions

| | i = 1, P = P1 | i = 1, P = P2 | i = 2, P = P1 | i = 2, P = P2 | i = 3, P = P1 | i = 3, P = P2 |
|---|---|---|---|---|---|---|
| j = 1, P = P1 | $TX_{1,P1}/RX_{1,P1}$ | $TX_{1,P2}/RX_{1,P1}$ | $TX_{2,P1}/RX_{1,P1}$ | $TX_{2,P2}/RX_{1,P1}$ | $TX_{3,P1}/RX_{1,P1}$ | $TX_{3,P2}/RX_{1,P1}$ |
| j = 1, P = P2 | $TX_{1,P1}/RX_{1,P2}$ | $TX_{1,P2}/RX_{1,P2}$ | $TX_{2,P1}/RX_{1,P2}$ | $TX_{2,P2}/RX_{1,P2}$ | $TX_{3,P1}/RX_{1,P2}$ | $TX_{3,P2}/RX_{1,P2}$ |
| j = 2, P = P1 | $TX_{1,P1}/RX_{2,P1}$ | $TX_{1,P2}/RX_{2,P1}$ | $TX_{2,P1}/RX_{2,P1}$ | $TX_{2,P2}/RX_{2,P1}$ | $TX_{3,P1}/RX_{2,P1}$ | $TX_{3,P2}/RX_{2,P1}$ |
| j = 2, P = P2 | $TX_{1,P1}/RX_{2,P2}$ | $TX_{1,P2}/RX_{2,P2}$ | $TX_{2,P1}/RX_{2,P2}$ | $TX_{2,P2}/RX_{2,P2}$ | $TX_{3,P1}/RX_{2,P2}$ | $TX_{3,P2}/RX_{2,P2}$ |
| j = 3, P = P1 | $TX_{1,P1}/RX_{3,P1}$ | $TX_{1,P2}/RX_{3,P1}$ | $TX_{2,P1}/RX_{3,P1}$ | $TX_{2,P2}/RX_{3,P1}$ | $TX_{3,P1}/RX_{3,P1}$ | $TX_{3,P2}/RX_{3,P1}$ |
| j = 3, P = P2 | $TX_{1,P1}/RX_{3,P2}$ | $TX_{1,P2}/RX_{3,P2}$ | $TX_{2,P1}/RX_{3,P2}$ | $TX_{2,P2}/RX_{3,P2}$ | $TX_{3,P1}/RX_{3,P2}$ | $TX_{3,P2}/RX_{3,P2}$ |

FIG. 4A shows radar sensor unit 44, having the three radar sensor elements 47.1, 47.2, 47.3, in a schematic illustration which elucidates the spatial association of the nine reception signals $TX_i/RX_j$, where i, j=1, 2, 3.

Radar sensor elements 47.1 through 47.3 are situated in a plane parallel to the housing underside of detection device 21. The plane parallel to the housing underside is defined by an X direction and a Y direction, advance direction 28 corresponding to the Y direction, and a direction perpendicular to advance direction 28 corresponding to the X direction. A direction perpendicular to the XY plane which extends into the depth of the subsurface is defined as the Z direction.

The reception signals include three monostatic reception signals $TX_i/RX_j$, where i=1, 2, 3, and six bistatic reception signals $TX_i/RX_j$, where i, j=1, 2, 3 and i≠j. "Monostatic" refers to the mode in which a sensor element simultaneously understood to mean a signal which is computed from the bistatic reception signals using a suitable mathematical function such as the average value, median, maximum value, or weighted sum.

Pulse repetition frequency PRF is in the frequency range of 1 kHz to 25 MHz, and exceeds the spatial sampling frequency by several orders of magnitude, so that the shift of detection device 21 in the Y direction due to the advance motion in a measuring step may be disregarded.

The six surface areas 72.1 through 72.3, 73.1 through 73.3 form five receiving channels 74.1, 74.2, 74.3, 74.4, 74.5 in advance direction 28 which are defined by a midpoint and a width. The midpoints of receiving channels 74.1 through 74.5 correspond to X coordinates $X_1$, $X_2$, $X_3$, $X_4$, $X_5$, and the width of receiving channels 74.1 through 74.5 corresponds to the width of the surface areas. The Y coordinates are changed as a result of the advance motion of detection device 21 in advance direction 28. Coordinate detection unit 48 detects the Y coordinates of surface areas 72.1 through 72.3, 73.1 through 73.3, and detects a reference coordinate which is situated at a known distance from surface areas 72.1 through 72.3, 73.1 through 73.3.

The reception signals are detected during the advance motion, and a portion of a depth section image is already computed from the detected reception signals. This portion of the depth section image is transmitted from control and evaluation unit 45 to display unit 26 via the real-time communication connection. The depth section image is regularly updated during the advance motion. Receiving channels 74.1 through 74.5 form the paths in which the reception signals are represented and regularly updated.

Figure 4B:
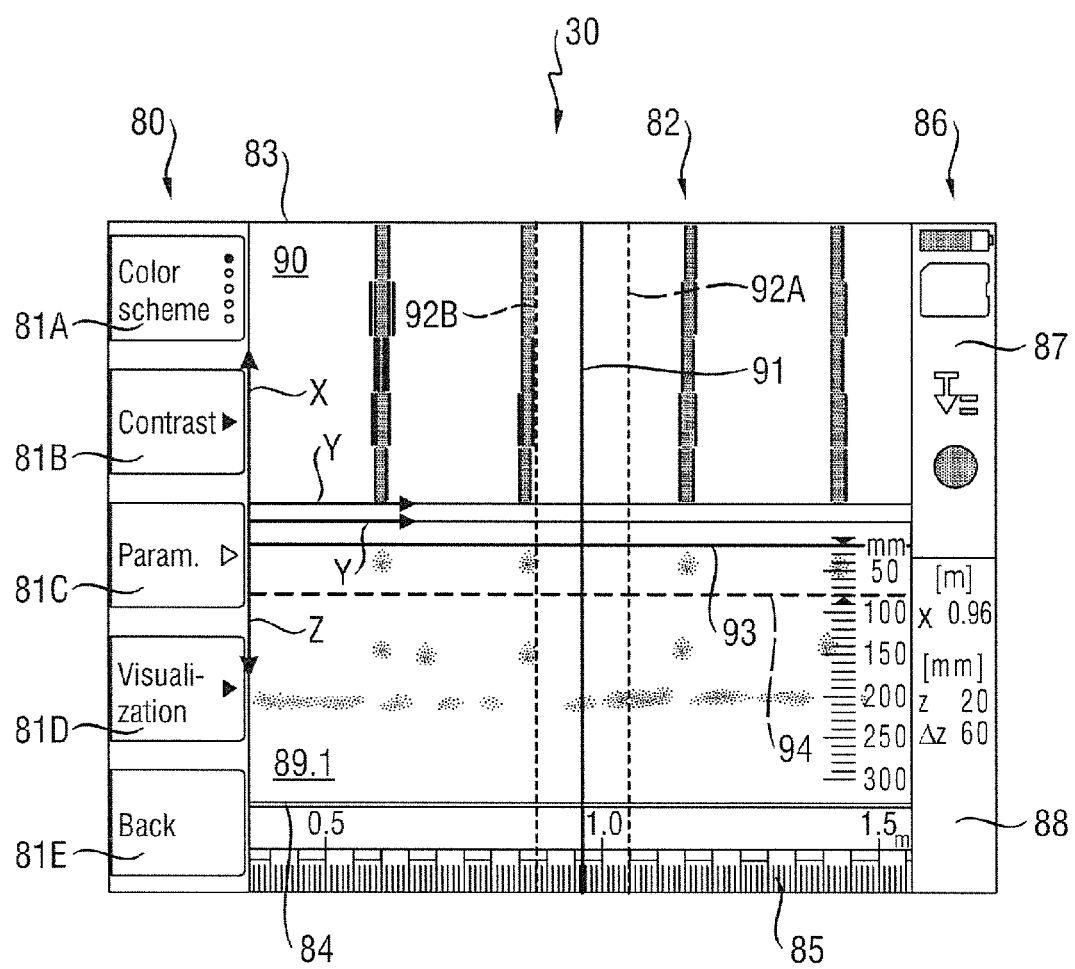

FIG. 4B shows display 30 of display unit 26, having a measuring recording of detection device 21 in a first operating mode in which detection device 21 is moved over the subsurface in a linear advance motion along advance direction 28. In the first operating mode, the width of the measuring recording in the X direction is limited to the width of the detection field. The width of the detection field is displayed to the user via upper and lower marks 38A, 38B, 39A, 39B on housing 22 of detection device 21. The resolution in the X direction is determined by the number of receiving channels 74.1 through 74.5.

During the display of a measuring recording in the first operating mode, display 30 is subdivided into three main fields: at the left edge of display 30, a function menu containing up to five functions 81A through 81E is illustrated in a first main field 80. Each function 81A through 81E is activated by function buttons 36A through 36E, respectively, of second control unit 31B on the left. A second main field 82 is situated in the middle area of display 30, and is used to display the measuring recording. In the first operating mode, second main field 82 is subdivided into three subareas situated one beneath the other: a top view is shown in an upper subarea 83, a depth section image is shown in a middle subarea 84, and an associated measuring scale is shown in a lower subarea 85. Various information for the user is displayed in a third main field 86 on the right edge of display 30. Third main field 86 is subdivided into an upper status area 87 and a lower information area 88. Status area 87 contains, among other things, information concerning a state of charge of power supply unit 46 or a memory card, the information being displayed in status area 87 in the form of pictograms. Instantaneous coordinates of the measuring recording are displayed in information area 88.

A depth section image is a two-dimensional representation of the measuring results in a plane which extends perpendicularly to the XY plane; in the XY plane, the depth direction is plotted on the vertical axis of the depth section image, and a horizontal direction is plotted on the horizontal axis. For a linear advance motion, the horizontal direction corresponds in particular to the advance direction; for a hand-held detection device or the movement of a hand-guided detection device along an arbitrary path, the horizontal direction corresponds in particular to a preferred direction defined by the detection device, for example along a housing edge. Raw data, i.e., the reception signals designed as hyperbolas, or further processed reception signals are represented in the depth section image. The reception signals are processed with the aid of image processing and pattern recognition methods to obtain information concerning the objects in the subsurface. In depth section images which use further processed reception signals, the objects are geometrically represented as objects; the shape and size of the objects are indicated by different colors.

A top view is a two-dimensional representation of the measuring results in the XY plane, and is computed from the depth section images as the average value, median, maximum value, weighted sum, or other suitable mathematical function over a depth range between a first depth and a second depth. The depth range is determined by the first and second depths or by a layer depth and a layer thickness. The depth range over which the top view is averaged is designed to be adjustable via rocker switch 33 of first control unit 31A. The top view represents only the objects which are present within the set depth range. All other objects which are situated outside the set depth range are not represented in the top view.

Middle subarea 84 shows a first depth section image 89.1 of receiving channel 74.1, in which the objects in the subsurface have been identified by pattern recognition; the cross section of iron grate 8 is apparent. The depth section image is defined by depth direction Z as the vertical axis, and advance direction 28 is defined as the horizontal axis. In addition to first depth section image 89.1 of first receiving channel 74.1, additional depth section images 89.2 through 89.5 for additional receiving channels 74.2 through 74.5 are stored. The transition between depth section images 89.1 through 89.5 remains unprocessed, or is interpolated using known interpolation methods. The user may switch back and forth between depth section images 89.1 through 89.5 with the aid of rocker switch 33.

Upper subarea 83 shows a top view 90 which has been computed from depth section images 89.1 through 89.5 over a depth range between a first depth z and a second depth z+$\Delta$z. With the aid of pattern recognition methods, the grate bars of iron grate 8 have been recognized in the averaged reception signals and displayed as grate bars in top view 90. For the color illustration of depth section images 89.1 through 89.5 and top view 90, the user may select among multiple color schemes. The color schemes are used to make differentiations in the display and to adapt to the brightness of the surroundings, and have no additional function.

Multiple vertical and horizontal marker lines are situated in second main field 82 of display 30, and are movable in part via rocker switch 33. Rocker switch 33 is adjustable between various settings via the function menu; the instantaneous setting of rocker switch 33 is displayed in status area 87. In a first setting, the layer depth and the layer thickness of the depth range are settable via rocker switch 33.

FIG. 4B shows a solid vertical marker line 91, two dotted vertical marker lines 92A, 92B, and solid and dashed horizontal marker lines 93, 94, respectively. Solid vertical marker line 91 characterizes the middle of the detection field, and corresponds to the position of marks 40A, 40B at the upper and lower edges, respectively, of housing 22. Dotted vertical marker line 92A indicates the right housing edge, and dotted vertical marker line 92B indicates the left housing edge of housing 22 of detection device 21. Solid horizontal marker line 93 defines the layer depth, and dashed horizontal marker line 94 defines the layer thickness of the depth range. The instantaneous position information for the middle of detection field (x), the layer depth (z), and the layer thickness ($\Delta$z) are displayed in information area 88. The top view illustrated in FIG. 4B is averaged over a depth range of 20 mm to 80 mm; the layer depth is 20 mm and the layer thickness is 60 mm. The middle of the detection field is at the X coordinate 0.96 m.

Figure 5:
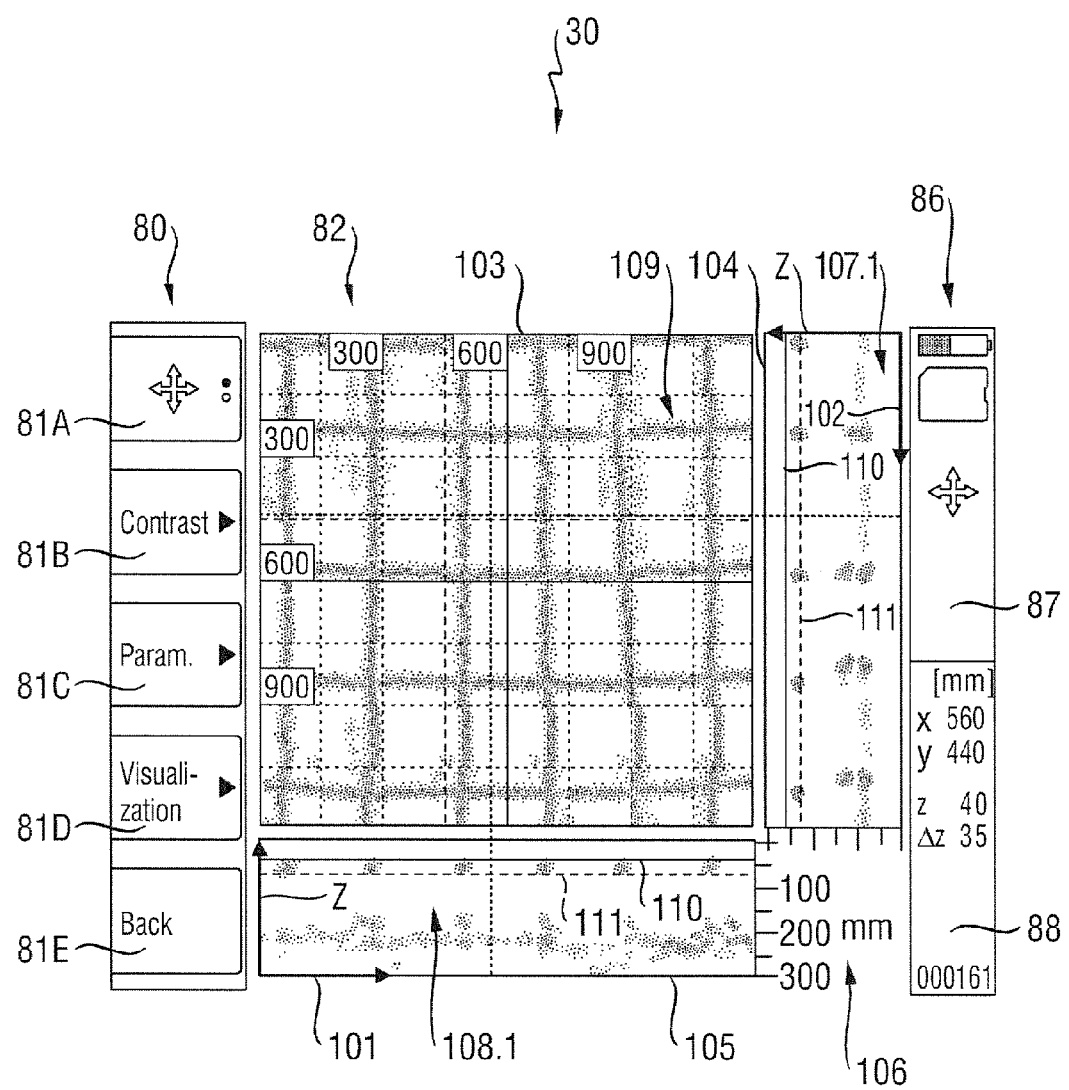
FIG. 5 shows a measuring recording of the detection device, which in a second operating mode is moved over the subsurface to be detected in parallel paths in two perpendicular advance directions, in a top view and two depth section images.

FIG. 5 shows display 30 of detection device 21 in a second operating mode in which detection device 21 is moved over the subsurface in multiple parallel measuring paths in a first advance direction 101 and a second advance direction 102 perpendicular to the first advance direction. For this purpose, a measuring grid is adhesively affixed to the subsurface, or the measuring grid is drawn directly on the subsurface. The measuring grid is necessary because the measuring paths traversed by detection device 21 should directly adjoin one another.

In the second operating mode of detection device 21, second main field 82 of display 30 is subdivided into four subareas which are arranged in the shape of a rectangle. A top view is shown in an upper left subarea 103, a first depth section image is shown in an upper right subarea 104, a second depth section image is shown in a lower left subarea 105, and an associated measuring scale for the first and second depth section images is shown in a lower right subarea 106.

The first depth section image in upper right subarea 104 shows a depth section image 107.1 which is defined by depth direction Z and second advance direction 77. Additional depth section images 107.2 through 107.30 perpendicular to second advance direction 77, i.e., in the direction of first advance direction 75, are stored; six parallel measuring paths and five receiving channels per measuring path result in 30 depth section images. The second depth section image in lower left subarea 105 shows a depth section image 108.1 which is defined by depth direction Z and first advance direction 75. Additional depth section images 108.2 through 108.30 perpendicular to first advance direction 75, i.e., in the direction of second advance direction 77, are stored; six parallel measuring paths and five receiving channels per measuring path result in 30 depth section images. Upper left subarea 103 shows a top view 109 which has been computed based on the first and/or second depth section image(s) over a depth range between first depth z and second depth z+Δz. Top view 109 illustrated in FIG. 5 is averaged over a depth range of 40 mm to 75 mm; layer depth z is 40 mm and layer thickness Δz is 35 mm.

A solid marker line 110 and a dashed marker line 111 which are movable via rocker switch 33 are situated in depth section images 107.1, 108.1. Solid marker line 110 defines layer depth z, and dashed marker line 111 defines layer thickness Δz of the depth range. The instantaneous position information for the crosshairs in the X and Y directions (x, y), the layer depth (z), and the layer thickness (Δz) are displayed in information area 88.

Figure 6A:
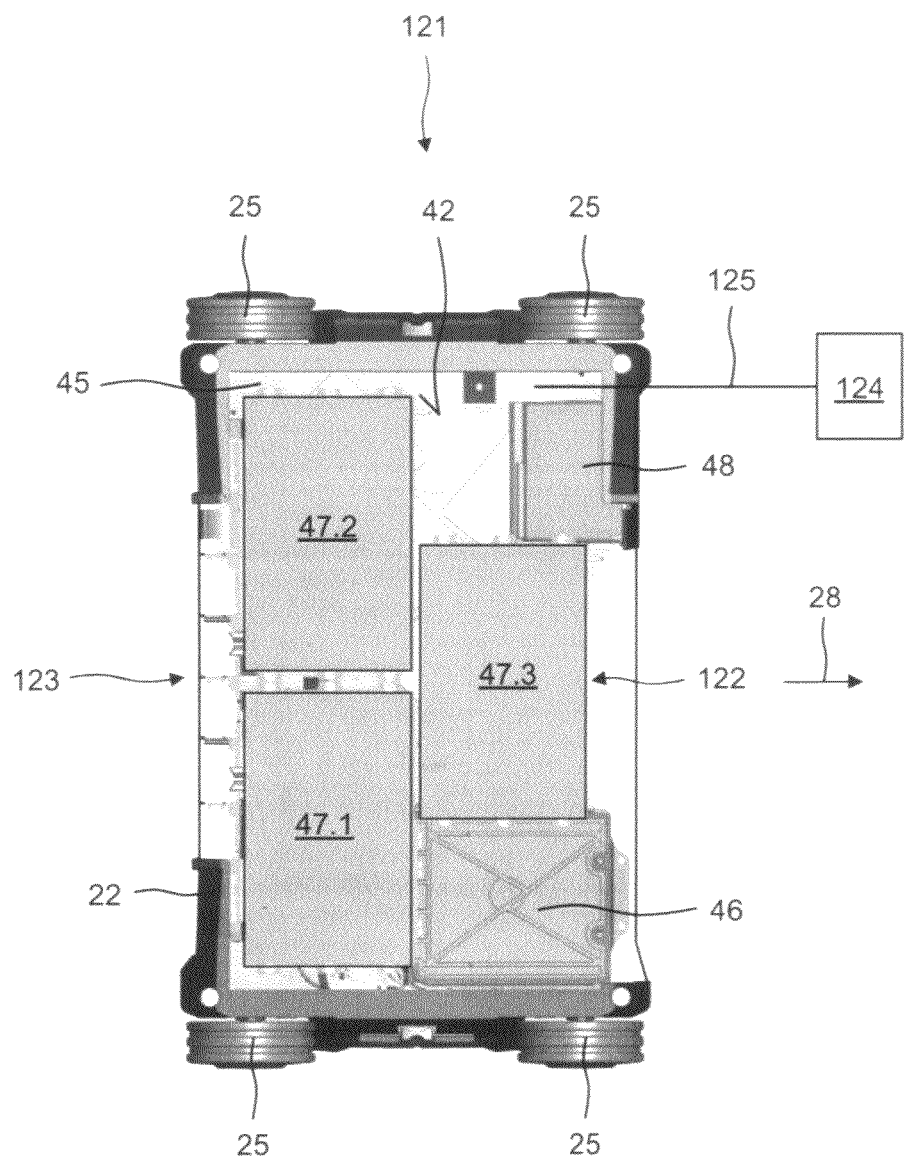

FIG. 6A shows another specific embodiment of a detection device 121 according to the present invention, in a view of a radar sensor unit 122 and a current sensor unit 123 from below. Radar sensor unit 122, similarly as for sensor unit 44 in FIG. 2B, is composed of three radar sensor elements 47.1 through 47.3 which are arranged in an interleaved configuration in two rows. Current sensor unit 123 is situated between the first row of radar sensor unit 122 and housing 22 of detection device 121.

To increase the reliability in detecting a power line and to ensure that a reception signal is actually generated by a power line that is present in the subsurface, current sensor unit 123 has a modulation unit 124 for modulating a current signal. Modulation unit 124 is connectable to control and evaluation unit 45 via a communication connection 125, and is designed, for example, in such a way that the modulation unit is plugged into a socket which is present in the subsurface and coupled to a phase of the power line. Control and evaluation unit 45 sends a control instruction to modulation unit 124, which via a communication connection 125 modulates the current signal having a predefined pattern. For evaluating the reception signals, control and evaluation unit 45 has an appropriate evaluation module for demodulating the reception signals.

FIG. 6B shows current sensor unit 123 of detection device 121 in an enlarged illustration. Current sensor unit 123 includes four first magnetic field sensor elements 126.1, 126.2, 126.3, 126.4 and three second magnetic field sensor elements 127.1, 127.2, 127.3 which are mounted in alternation on a printed circuit board 128. Printed circuit board 128 is used as a retaining element for the mechanical fastening and for the electrical connection for first and second magnetic field sensor elements 126.1 through 126.4, 127.1 through 127.3. A connecting element 129 via which printed circuit board 128 is connected to control and evaluation unit 45 is present on printed circuit board 128.

Magnetic field sensor elements 126.1 through 126.4, 127.1 through 127.3 are oriented in two mutually perpendicular horizontal directions 130, 131. The direction into the subsurface which is perpendicular to horizontal directions 130, 131 is defined as depth direction 132.

FIG. 6C shows first magnetic field sensor element 126 of current sensor unit 123 in detail. First magnetic field sensor element 126 includes a printed circuit board section 133, a first pair of magnetic field sensors 134A, 134B, and an amplifier 135. In the specific embodiment in FIG. 6C, magnetic field sensors 134A, 134B are designed as coils and are oriented along second horizontal direction 131. Magnetic field sensors 134A, 134B are parallel to one another and separated at a distance from one another in depth direction 132, and measure an alternating magnetic field $B_{x,A}$, $B_{x,B}$ (50/60 Hz, for example) in first horizontal direction 130.

FIG. 6D shows second magnetic field sensor element 127 of current sensor unit 123 in detail. Second magnetic field sensor element 127 includes a printed circuit board section 136, a second pair of magnetic field sensors 137A, 137B, and an amplifier 138. In the specific embodiment in FIG. 6D, magnetic field sensors 137A, 137B are designed as coils and are oriented along depth direction 132. Magnetic field sensors 137A, 137B are parallel to one another and separated at a distance from one another in second horizontal direction 131, and measure an alternating magnetic field $B_{z,A}$, $B_{z,B}$ (50/60 Hz, for example) in depth direction 132.

To eliminate a homogeneous direct-current magnetic field (homogeneous alternating field) during the detection, a differential value $\Delta B_x$ between magnetic field sensors 134A, 134B of the first pair and differential value $\Delta B_z$ between magnetic field sensors 137A, 137B of the second pair are computed. Homogeneous direct-current magnetic fields are eliminated as a result of the difference formation. An average absolute value $\Delta B_{xz}=\sqrt{(\Delta B_x)^2+(\Delta B_z)^2}$ is computed from differential values $\Delta B_x$, $\Delta B_z$ of the adjacent first and second pairs of magnetic field sensors. Current sensor unit 123 shown in FIG. 6B, having four first magnetic field sensor elements 126.1 through 126.4 and three second magnetic field sensor elements 127.1 through 127.3, results in six measured values $\Delta B_{xz,1}$ through $\Delta B_{xz,6}$ which are associated with six different X coordinates along first horizontal direction 130. Based on measured values $\Delta B_{xz,1}$ through $\Delta B_{xz,6}$, control and evaluation unit 46 is able to ascertain the course of the power line in the subsurface and to transmit a horizontal representation (XY representation) of the subsurface together with the power line to display unit 26.

In detection device 121 in FIG. 6A, having first and second sensor units 122, 123, respectively, first and second magnetic field sensor elements 126.1 through 126.4, 127.1 through 127.3, respectively, are situated in alternation along first horizontal direction 130, and detect in first horizontal direction 130 a measuring range which corresponds to the detection field of first sensor unit 122. The measuring results of first and second sensor units 122, 123, respectively, may be represented on display unit 26 as separate measuring recordings or in a joint measuring recording.

Figure 7A:
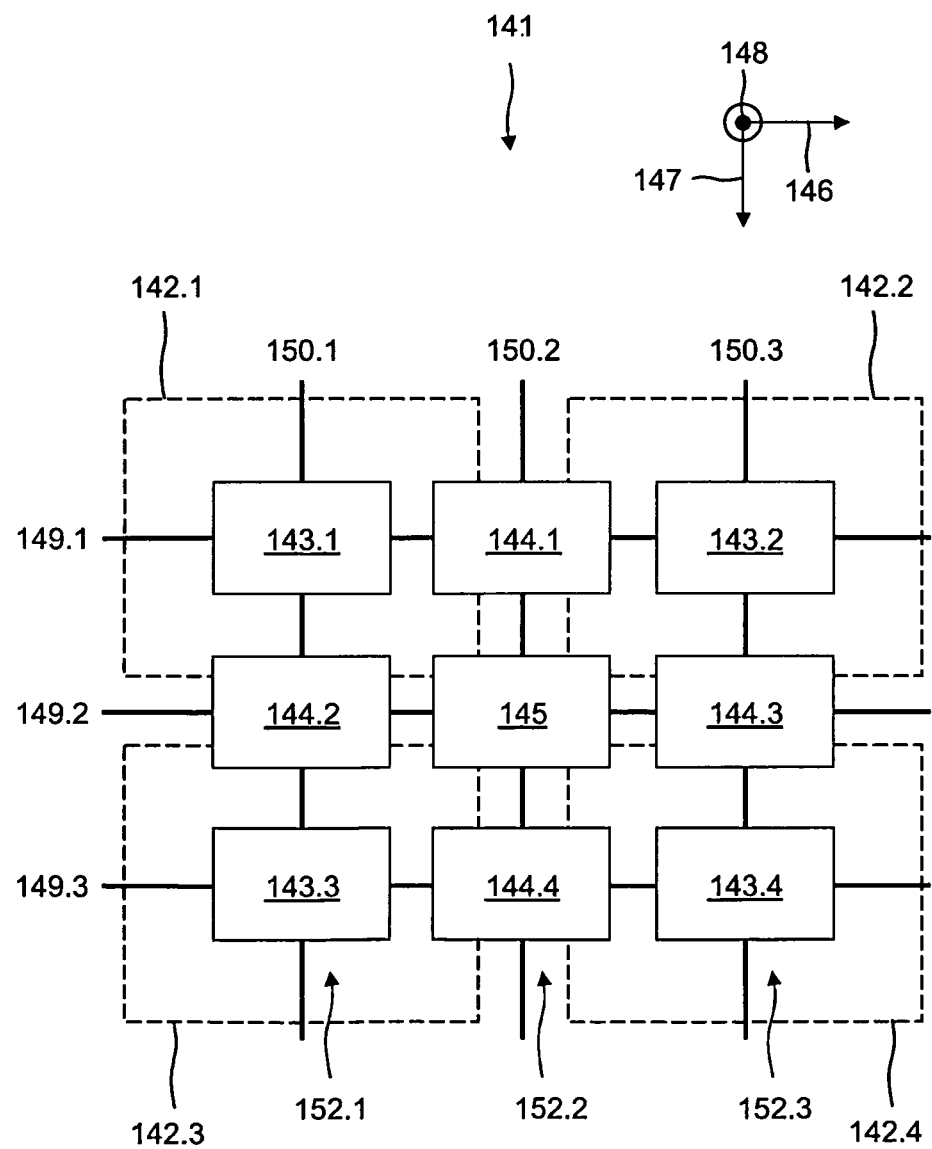
FIGS. 7A, 7B show a first specific embodiment of a sensor unit for a held detection device having four sensor elements uniformly arranged in rows and columns (FIG. 7A), and a second specific embodiment having five sensor elements in an interleaved configuration (FIG. 7B).

FIG. 7A shows a first specific embodiment of a sensor unit 141, having four sensor elements 142.1 through 142.4 which are uniformly arranged in a rectangular configuration in two rows and two columns. Each sensor element 142.1 through 142.4 operates as a transmitting element in transmitting mode, and as a receiving element in receiving mode. If the four sensor elements 142.1 through 142.4 are controlled by control and evaluation unit 45, as described, in such a way that in each case one sensor element transmits and all sensor elements receive, and this operation is carried out for all sensor elements, this results in a receiving field having nine receiving areas.

The nine receiving areas may be divided into three categories of receiving areas. A monostatic receiving area 143.1 through 143.4, which in each case represents the monostatic reception signal, is directly associated with each sensor element, resulting in four monostatic receiving areas. Between every two adjacent sensor elements in a row or a column, a receiving area 144.1 through 144.4 is present in which an averaged signal of the two bistatic reception signals is represented; for four sensor elements 142.1 through 142.4, four receiving areas result in this way. Between four sensor elements oriented in a rectangular configuration, in the area of the midpoint a further receiving area 145 results in which an averaged signal of the four bistatic reception signals is represented; for four sensor elements 142.1 through 142.4, an additional receiving area results in this way. The term "averaged signal" means that an average value is formed between the reception signals, it being possible for the two reception signals to be weighted equally or also much differently from one another.

Sensor unit 141 is suitable for use in a held detection device. Sensor elements 142.1 through 142.4 are situated in perpendicular rows and columns along a first horizontal direction 146 and along a second horizontal direction 147; the direction into the subsurface perpendicular to horizontal directions 146, 147 is defined as depth direction 148. Depth section images may be computed in first and second directions 146, 147, respectively, based on the monostatic and bistatic reception signals, as schematically illustrated in FIG. 7A. In addition to the depth section images, a top view is computed from the depth section images in first or second horizontal direction 146, 147, respectively, or from the nine receiving areas over a depth range between a first depth and a second depth.

The depth section images in first horizontal direction 145 are defined by depth direction 148 as the vertical axis and by first horizontal direction 145 as the horizontal axis. In first horizontal direction 145, a first depth section image 149.1 is computed based on the three receiving areas 143.1, 144.1, 143.2, a second depth section image 149.2 is computed based on the three receiving areas 144.2, 145, 144.3, and a third depth section image 149.3 is computed based on the three receiving areas 143.3, 144.4, 143.4. The depth section images in second horizontal direction 146 are defined by depth direction 148 as the vertical axis and by second horizontal direction 146 as the horizontal axis. In second horizontal direction 146, a first depth section image 150.1 is computed based on the three receiving areas 143.1, 144.2, 143.3, a second depth section image 150.2 is computed based on the three receiving areas 144.1, 145, 144.4, and a third depth section image 150.3 is computed based on the three receiving areas 143.2, 144.3, 143.4.

The three receiving areas 143.1, 144.1, 143.2 form a first horizontal receiving channel 151.1, the three receiving areas 144.2, 145, 144.3 form a second horizontal receiving channel 151.2, and the three receiving areas 143.3, 144.4, 143.4 form a third horizontal receiving channel 151.3. The three receiving areas 143.1, 144.2, 143.3 form a first vertical receiving channel 152.1, the three receiving areas 144.1, 145, 144.4 form a second vertical receiving channel 152.2, and the three receiving areas 143.2, 144.3, 143.4 form a third vertical receiving channel 152.3.

Figure 7B:
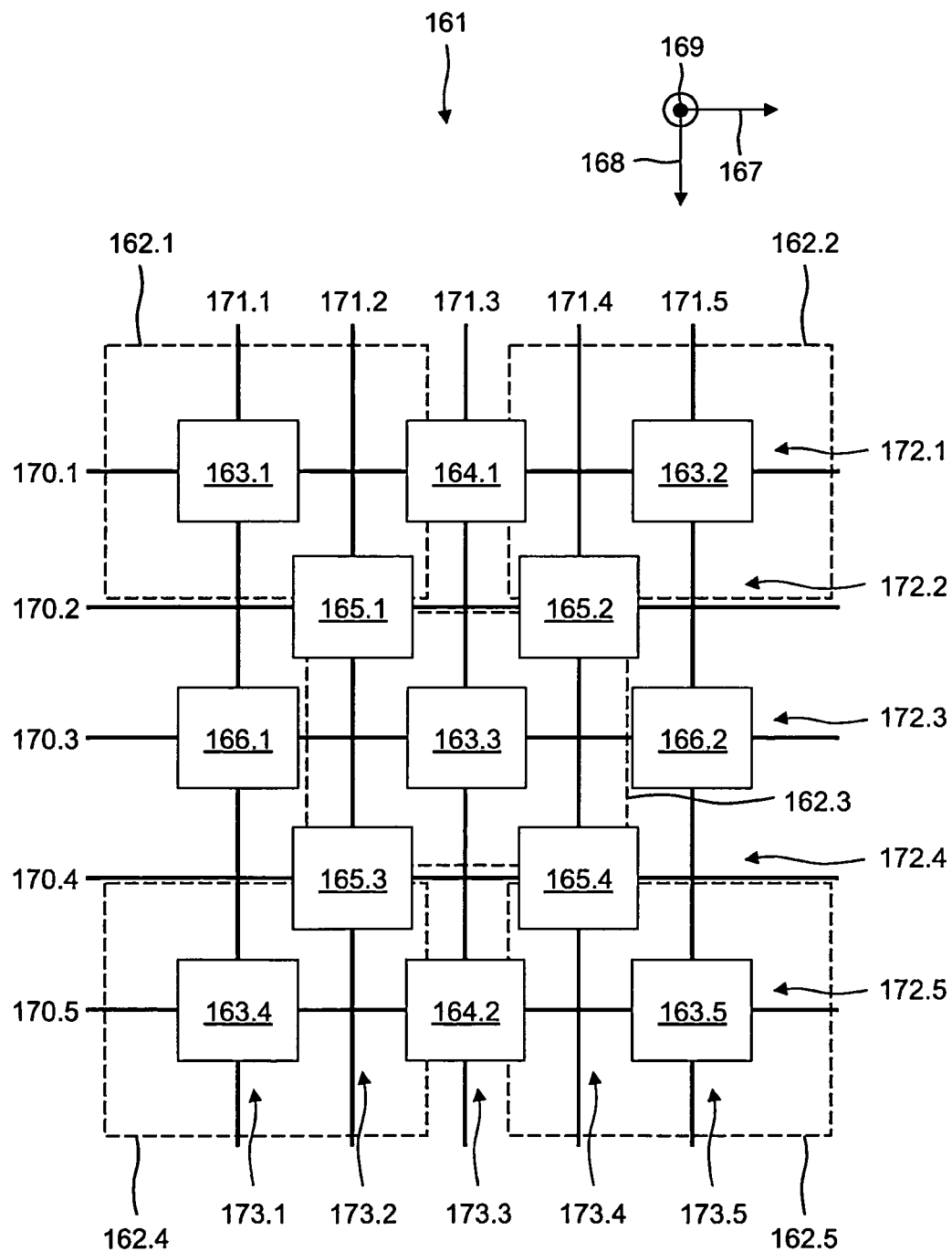

FIG. 7B shows a second specific embodiment of a sensor unit 161 having five sensor elements 162.1 through 162.5 in an interleaved configuration. Each sensor element 162.1 through 162.5 operates as a transmitting element in transmitting mode, and as a receiving element in receiving mode. The five sensor elements 162.1 through 162.5 result in a receiving field having 13 receiving areas.

The receiving areas may be divided into four categories of receiving areas. A monostatic receiving area 163.1 through 163.5, which in each case represents the monostatic reception signal, is associated with each sensor element 162.1 through 162.5, resulting in five monostatic receiving areas 163.1 through 163.5. Between two adjacent sensor elements in a row, a receiving area 164.1, 164.2 is present in each case in which an averaged signal of the two bistatic reception signals is represented; for five sensor elements 162.1 through 162.5, two receiving areas 164.1, 164.2 result in this way. Between two sensor elements arranged in a diagonal, a receiving area 165.1 through 165.4 is present in each case in which an averaged signal of the two bistatic reception signals is represented; for five sensor elements 162.1 through 162.5, four receiving areas result in this way. Between two sensor elements situated in rows having the same configuration, a receiving area 166.1, 166.2 is present in each case in which an averaged signal of the two bistatic reception signals is represented; for five sensor elements 162.1 through 162.5, two receiving areas 166.1, 166.2 result in this way.

Sensor unit 161 is suited, among other things, for use in a held detection device. Sensor elements 162.1 through 162.5 are situated along a first horizontal direction 167 and along a second horizontal direction 168; the direction into the subsurface perpendicular to horizontal directions 167, 168 is defined as depth direction 169. Depth section images may be computed in first and second horizontal direction 167, 168, respectively, based on the reception signals, as schematically illustrated in FIG. 7B. In addition to the depth section images, a top view is computed from the depth section images in first or second horizontal direction 167, 168, or from the 13 receiving areas over a depth range between a first depth and a second depth.

The depth section images in first horizontal direction 167 are defined by depth direction 169 as the vertical axis, and by first horizontal direction 167 as the horizontal axis. In first horizontal direction 167, first depth section image 170.1 is computed based on the three receiving areas 163.1, 164.1, 163.2, a second depth section image 170.2 is computed on the two receiving areas 165.1, 165.2, a third depth section image 170.3 is computed based on the three receiving areas 166.1, 163.2, 166.2, a fourth depth section image 170.4 is computed based on the two receiving areas 165.3, 165.4, and a fifth depth section image 170.5 is computed based on the three receiving areas 163.3, 164.2, 163.5.

The depth section images in second horizontal direction 168 are defined by depth direction 169 as the vertical axis and by second horizontal direction 168 as the horizontal axis. In second horizontal direction 168, a first depth section image 171.1 is computed based on the three receiving areas 163.1,

166.1, 163.4, a second depth section image 171.2 is computed based on the two receiving areas 165.1, 165.3, a third depth section image 171.3 is computed based on the three receiving areas 164.1, 163.3, 164.2, a fourth depth section image 171.4 is computed based on the two receiving areas 165.2, 165.4, and a fifth depth section image 171.5 is computed based on the three receiving areas 163.2, 166.2, 163.5.

The three receiving areas 163.1, 164.1, 163.2 form a first horizontal receiving channel 172.1, the two receiving areas 165.1, 165.2 form a second horizontal receiving channel 172.2, the three receiving areas 166.1, 163.2, 166.2 form a third horizontal receiving channel 172.3, the two receiving areas 165.3, 165.4 form a fourth horizontal receiving channel 172.4, and the three receiving areas 163.3, 164.2, 163.5 form a fifth horizontal receiving channel 172.5. The three receiving areas 163.1, 166.1, 163.4 form a first vertical receiving channel 173.1, the two receiving areas 165.1, 165.3 form a second vertical receiving channel 173.2, the three receiving areas 164.1, 163.3, 164.2 form a third vertical receiving channel 173.3, the two receiving areas 165.2, 165.4 form a fourth vertical receiving channel 173.4, and the three receiving areas 163.2, 166.2, 163.5 form a fifth vertical receiving channel 173.5.

Besides a held detection device, sensor units 141, 161 may also be used in a guided detection device. In a guided detection device which is moved along an arbitrary path, two perpendicular directions in the XY plane are defined by the device manufacturer, for example directions which are preferred by the configurations of the sensor elements. In the XY plane, the reception signals detected by the sensor elements are associated with the X and Y coordinates which are detected with the aid of a coordinate detection unit. The depth section images are computed along the two perpendicular directions. A top view is determined from the depth section images or directly from the reception signals.

Sensor units 141, 161 have been presented in FIGS. 7A, 7B as specific embodiments of a sensor unit for a held detection device. Due to the symmetrical configuration of the sensor elements, sensor units 141, 161 are also suited in particular for a guided detection device having an arbitrary advance motion. Since no direction is preferred for an arbitrary advance motion, the number of transmitting elements and receiving elements in both directions should be equal in order to achieve a comparable spatial resolution.

Detection device 21 may be moved back and forth multiple times over the subsurface to be detected in order to increase the accuracy of the measurement. For this purpose, a symmetrical configuration of the transmitting elements and receiving elements is necessary, as provided in sensor units 141, 161.

What is claimed is:

1. A method for detecting an object in a subsurface, comprising the following steps:
    emitting a transmission signal into the subsurface via a transmitting element of a transmitting unit;
    receiving a reception signal, the reception signal being a function of the transmission signal and properties of the object and of the subsurface, by each receiving element of a receiving unit;
    emitting a further transmission signal into the subsurface via a further transmitting element of the transmitting unit; and
    receiving a further reception signal as a function of the further transmission signal and the properties of the object and of the subsurface by each receiving element of the receiving unit, wherein a control and evaluation unit computes multiple depth section images based on the reception signal.

2. The method as recited in claim 1 wherein a top view is computed from the depth section images and displayed on the display unit, the top view being computed as the average value, median, maximum value, or weighted sum over a depth range between a first depth and a second depth.

3. The method as recited in claim 2, further comprising the step of depicting only objects that exceed a threshold value in the top view.

4. The method as recited in claim 2, further comprising the step of interpolating the depth section images.

5. The method as recited in claim 1, further comprising the steps of:
    moving the detection device over the subsurface in parallel measuring paths in a first advance direction and a second advance direction perpendicular to the first advance direction; and
    calculating multiple depth section images from the reception signals in the first advance direction and the second advance direction.

6. The method as recited in claim 5, further comprising the steps of:
    calculating a common top view from the multiple depth section images of the first and second advance directions between a first depth and a second depth; and
    displaying the common top view on the display unit.

7. The method as recited in claim 1, further comprising the step of receiving a second reception signal by a second sensor unit.

8. The method as recited in claim 7, further comprising the steps of:
    calculating common depth section images from the reception signals of the receiving unit and from the second reception signal of the second sensor unit by the control and evaluation unit; and
    calculating a common top view from the common depth section images between a first depth and a second depth.

9. The method as recited in claim 7, further comprising the steps of:
    calculating separate depth section images from the reception signals of the receiving unit and from the second reception signal of the second sensor unit by the control and evaluation unit; and
    calculating separate top views from the separate depth section images between a first depth and a second depth.

* * * * *